US008799001B2

(12) United States Patent
Agapi et al.

(10) Patent No.: US 8,799,001 B2

(45) Date of Patent: Aug. 5, 2014

(54) METHOD AND SYSTEM FOR DEFINING STANDARD CATCH STYLES FOR SPEECH APPLICATION CODE GENERATION

(75) Inventors: Ciprian Agapi, Lake Worth, FL (US); Felipe Gomez, Weston, FL (US); James R. Lewis, Delray Beach, FL (US); Vanessa V. Michelini, Boca Raton, FL (US); Sibyl C. Sullivan, Highland Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 2369 days.

(21) Appl. No.: 10/715,316

(22) Filed: Nov. 17, 2003

(65) Prior Publication Data

US 2005/0108015 A1 May 19, 2005

(51) Int. Cl.
*G10L 15/22* (2006.01)

(52) U.S. Cl.
USPC ........... 704/275; 704/270; 715/727; 715/810; 717/107

(58) Field of Classification Search
USPC ............... 704/270.1, 270, 275; 715/727, 810; 717/107
See application file for complete search history.

(56) References Cited

U.S. PATENT DOCUMENTS 4,964,077 A 10/1990 Eisen et al.
5,124,942 A 6/1992 Nielsen et al.
5,287,448 A 2/1994 Nicol et al.
5,485,544 A 1/1996 Nonaka et al.
5,513,308 A 4/1996 Mori
5,544,305 A * 8/1996 Ohmaye et al. ............... 715/776
5,737,726 A 4/1998 Cameron et al.
6,141,724 A * 10/2000 Butler et al. .................. 717/107
6,173,266 B1 * 1/2001 Marx et al. ..................... 704/270
6,269,336 B1 7/2001 Ladd et al.
6,314,449 B1 11/2001 Gallagher et al.
6,446,081 B1 * 9/2002 Preston ....................... 707/104.1
6,490,564 B1 * 12/2002 Dodrill et al. ................. 704/275
6,598,022 B2 * 7/2003 Yuschik ......................... 704/275
6,658,386 B2 * 12/2003 Kemble et al. ................ 704/270
6,725,378 B1 4/2004 Schuba et al.
6,940,953 B1 * 9/2005 Eberle et al. ............... 379/88.13
7,136,804 B2 * 11/2006 Lavallee et al. ................... 704/4
7,143,042 B1 * 11/2006 Sinai et al. ................. 704/270.1
7,149,694 B1 * 12/2006 Harb et al. ................. 704/270.1
7,197,460 B1 * 3/2007 Gupta et al. ............... 704/270.1
7,197,461 B1 * 3/2007 Eberle et al. .................. 704/275

(Continued)

*Primary Examiner* — Martin Lerner

(74) *Attorney, Agent, or Firm* — Wolf, Greenfield & Sacks, P.C.

(57) ABSTRACT

A method and system for defining standard catch styles used in generating speech application code for managing catch events, in which a style-selection menu that allows for selection of one or more catch styles is presented. Each catch style represents a system response to a catch event. A catch style can be selected from the style-selection menu. For each selected catch style, the system can prepare a response for each catch event. If the selected catch style requires playing a new audio message in response to a particular catch event, a contextual message can be entered in one or more text fields. The contextual message entered in each text field corresponds to the new audio message that will be played in response to the particular catch event. In certain catch styles, the entered contextual message is different for each catch event, while in other catch styles, the entered contextual message is the same for each catch event. Finally, if the selected catch style does not require playing of a new audio message in response to a particular catch event, the system can replay the system prompt.

23 Claims, 3 Drawing Sheets

(56) References Cited

U.S. PATENT DOCUMENTS

| | | | | |
|---|---|---|---|---|
| 7,260,535 | B2 * | 8/2007 | Galanes et al. | 704/270 |
| 7,266,181 | B1 * | 9/2007 | Zirngibl et al. | 379/88.17 |
| 7,490,286 | B2 | 2/2009 | Commarford et al. | |
| 7,797,676 | B2 * | 9/2010 | Agapi et al. | 717/109 |
| 2002/0010715 | A1 | 1/2002 | Chinn et al. | |
| 2002/0026435 | A1 * | 2/2002 | Wyss et al. | 707/1 |
| 2002/0062475 | A1 | 5/2002 | Iborra et al. | |
| 2002/0072910 | A1 * | 6/2002 | Kernble et al. | 704/270 |
| 2002/0147963 | A1 | 10/2002 | Lee | |
| 2002/0198719 | A1 | 12/2002 | Gergic et al. | |
| 2003/0046660 | A1 | 3/2003 | Watanabe | |
| 2003/0139930 | A1 | 7/2003 | He et al. | |
| 2004/0006478 | A1 | 1/2004 | Adpdemir et al. | |
| 2004/0122674 | A1 | 6/2004 | Bangalore et al. | |
| 2005/0091057 | A1 * | 4/2005 | Phillips et al. | 704/270.1 |
| 2006/0025997 | A1 * | 2/2006 | Law et al. | 704/257 |

* cited by examiner

METHOD AND SYSTEM FOR DEFINING STANDARD CATCH STYLES FOR SPEECH APPLICATION CODE GENERATION

BACKGROUND OF THE INVENTION

1. Statement of the Technical Field

The present invention relates to the field of speech application code generation and more particularly to predefining and implementing an interface that allows a programmer or application developer to select one of a variety of styles in order to manage standard catch events.

2. Description of the Related Art

Programmers of interactive speech applications are often faced with the challenge of managing standard catch events, where standard catch events are defined as user requests for help, a non-input entry, in which the system does not receive any user response, or a non-matching entry, in which the user entry is not understood, that may occur during a given dialog turn. A large amount of source code is dedicated to managing and preparing audio responses to these catch events. Typical practice is for a programmer to reuse existing code by copying the code and pasting it where required throughout a new application. While this is a tedious process, the process becomes even more time-consuming when the programmer does not simply copy and paste the code, but must also modify the copied text in order in order to allow the system to play different audio messages for each specific catch event. Needless to say, this takes valuable programming time away from the application developer and often results in an error-laden application.

It would greatly benefit programmers of interactive speech applications to provide an interface that gives the programmer the option of selecting a specific style, where each style allows the programmer to use specific forms to provide non-static information for each dialog turn. The system could then use this information in a code-generation step to generate the appropriate speech application code for a particular application.

Because of the unique attributes of different interactive voice applications, programmers, when creating code in response to standard catch events, would benefit from having the option to select one of a variety of styles, where the styles range in complexity from simply repeating a prompt to the user, to the playing of different audio messages for each specific catch event.

Because programmers often work in teams, the code generated in interactive speech applications is often passed from one programmer to another for modification. By restricting a programmer to a specific style selected by his predecessor, the ability to efficiently modify a portion of code may be limited. While making a style-selection interface available would provide additional flexibility for programmers, the added ability to seamlessly select, de-select and/or change the style would prove to be of great value in a scenario where multiple programmers and developers share responsibility for the preparation of speech generation code.

Accordingly, it is desirable to provide a method and system that provides a programmer of an interactive voice response application with an interface that presents a variety of catch styles, thereby allowing the programmer to selectively choose a style that suits his or her programming needs and, if desired, allows for the recording and playing of specific audio messages in response to standard catch events.

SUMMARY OF THE INVENTION

The present invention addresses the deficiencies of the art with respect to managing standard catch events in interactive speech applications and provides a novel and non-obvious method, system and apparatus for predefining standard catch styles for speech application code generation. In particular, in accordance with the principals of the present invention, an interface may be presented to a programmer, allowing the programmer to select from a variety of standard catch event styles, wherein each style includes a pre-determined complexity level of response. Notably, the programmer may select a particular style, amend the selected style, and/or choose a different style, to suit the programmer's needs for a particular interactive voice application.

Methods consistent with the present invention provide a method for defining standard catch styles used in generating speech application code for managing catch events resulting from a system prompt. The method includes presenting a style-selection menu that allows for selection of one or more catch styles. Each catch style represents a system response to a catch event. A catch style is selected from the style-selection menu. For each selected catch style, the system prepares a response for each catch event.

If the selected catch style requires playing a new audio message in response to a particular catch event, a contextual message is entered in one or more text fields. The contextual message entered in each text field corresponds to the new audio message that will be played in response to the particular catch event. In certain catch styles, the entered contextual message is different for each catch event, while in other catch styles, the entered contextual message is the same for each catch event. Finally, if the selected catch style does not require playing of a new audio message in response to a particular catch event, the system replays the system prompt.

Systems consistent with the present invention include a system for managing catch events in a speech application. This system includes a computer where the computer includes a style-selection interface having a style-selection template for selecting one of one or more catch styles wherein each catch style represents a system response to a catch event. Notably, the style selection interface can include one or more text fields for receiving a contextual message, where the contextual message entered in each text field corresponds to the new audio message that will be played in response to the particular catch event. Finally, the style-selection interface may include a field reciting details about the one or more catch styles and/or a field identifying a final action to be taken if the catch event is not corrected.

In still another aspect, the present invention provides a computer readable storage medium storing a computer program which when executed defines standard catch styles used in generating speech application code for managing catch events. The standard catch styles are defined by presenting a style-selection menu that allows for selection of one or more catch styles. Each catch style corresponds to a system response to a catch event. Upon selection of a catch style, a system response is prepared for each catch event.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system and method of creating and defining standard catch styles in order to simplify a programmer's task in managing standard catch events while generating speech application code such as, for example, VoiceXML source code. Specifically, an interface may be presented to a programmer or application developer that allows him or her to select one of a number of different catch "styles" where each "style" provides a different level of complexity with regard to preparing the system's audio response played in a typical dialog turn. A dialog turn, in this case, is initiated upon the occurrence of a standard catch event, where a standard catch event in an interactive voice application is defined as user requests for help, or a no-input or no-match event.

Figure 1:
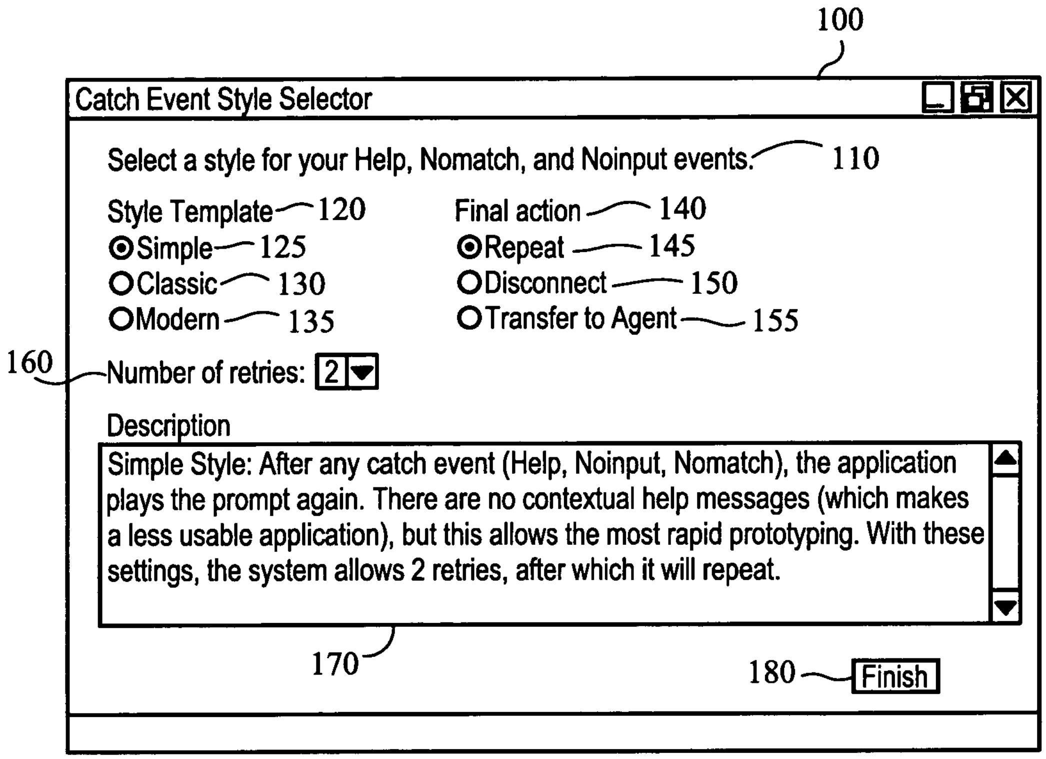
FIG. 1 is a computer screen illustrating the style-selection interface of the present invention.

Referring now to the drawing figures in which like reference designators refer to like elements, there is shown in FIG. 1 a computer screen illustrating a style-selection menu 100 presented to a programmer or application developer. Instead of copying existing speech application code, modifying the code to conform to the programmer's needs, and then pasting the code into a new application, interface 100 provides the programmer with increased programming flexibility by allowing him or her to select a specific style that corresponds to text created to respond to a variety of catch events. The system then uses this text in a code generation step to generate speech application code for the current application.

FIG. 1 is an exemplary illustration of the style-selection menu 100 of the present invention. Menu 100 includes instructions 110, directing the programmer to select a particular catch style from a style template 120. In this illustration, three styles choices are presented, each having different characteristics: Simple 125, Classic 130 and Modern 135. These exemplary templates are explained in greater detail below. Although the style template 120 in FIG. 1 shows three exemplary style choices, it is within the spirit of the invention to include any number of style choices, appropriately named, where each style is associated with different characteristics. Each style corresponds to a specific level of code generation, where the system must generate code that eventually becomes an audio message, either through text-to-speech conversion or through the playing of a pre-recorded audio message, at the occurrence of a catch event. For example, if a user, after requesting that a car be made available for rental, is then prompted to speak the name of the city where the user wants to pick up his or her rental car, and the user utters the word "Help" or does not respond ("no input" response), or utters a non-matching phrase such as "On Tuesday", an audio response must be played in response to this "catch event". The programmer, in generating code to respond to the catch event via style template 120, now has the option to select specific text that will be played as an audio message in response to the catch event. Or, the programmer may choose not to play any message and instead simply replay the prompt that initiated the catch event in the hopes that the user will respond properly.

Menu 100 further includes a retry-selection template 160. Retry-selection template 160 is, preferably, a drop down menu that allows the programmer to customize the number of times the user has to correct the catch event before a final action is to be taken. Final Action selection template 140 allows the programmer to select one of a number of final actions to be taken after the number of retries has been exceeded. For example, the final action may be to simply repeat a user prompt 145, disconnect the user from the system 150, or transfer the user to an agent 155. The final actions illustrated in FIG. 1 are only exemplary and may include other final actions such as, for example, generating code that allows the user to choose Dual Tone Multi-Frequency (DTMF) as the mode of user input. Preferably, a description panel 170 is presented that provides details about the selected style and indicates consequences for the combination of the selected catch style, final action, and number of retries.

As an example of one type of catch style, the programmer may select the Simple Style 125 from the Style Template 120. The Simple Style 125 treats all catch events in the same manner. No additional audio message is played. Therefore, the user is not directed to a further screen with prompts to enter additional text. Selection of Simple Style 125 results in the replaying of the initial prompt, i.e. the prompt that ultimately led to the catch event. Therefore, regardless of the type of catch event, i.e. a request for help, a non-match response, or simply no response at all, the user is represented with the system prompt. This occurs up to the number of retries as indicted in field 160 that the programmer has selected. The selection of this style allows the programmer to generate a surface-level prototype quickly. The programmer may select a different style during later code development. Because the Simple Style 125 does not result in the playing of any audio messages, a Finish button 180 is presented to the programmer after selection of this style.

Figure 2:
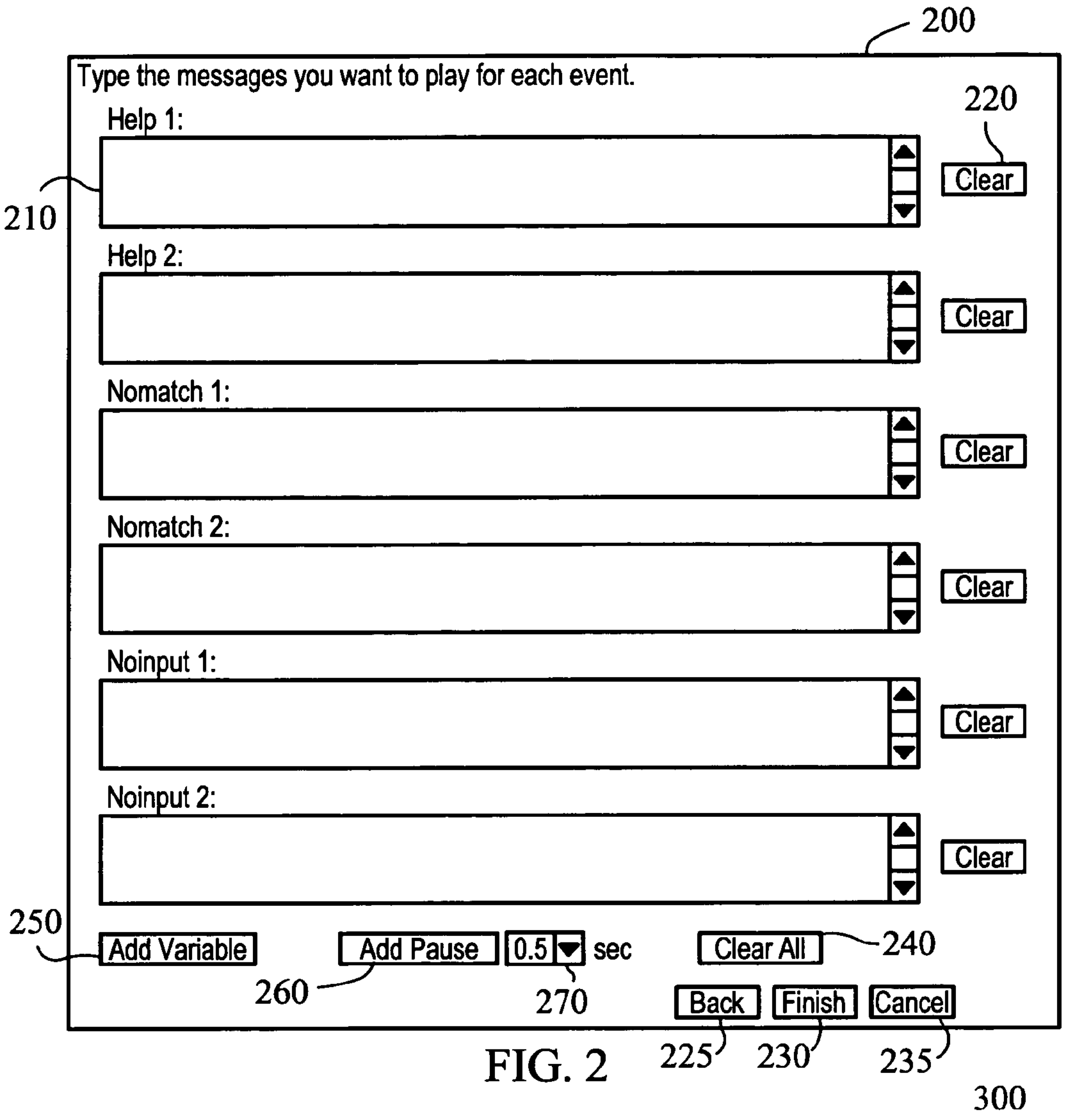
FIG. 2 is a computer screen illustrating an example of the style-selection interface of the present invention where different contextual messages are played for each catch event.

If the programmer prefers that the system play different audio messages in response to particular catch events, a second, intermediate style level may be selected. For example, the Classic Style 130 may be selected. By selecting this style, the programmer is presented with an additional screen that presents text fields, which can be filled in with contextual messages that will be played as audio messages in response to a particular catch event. FIG. 2 illustrates an example of a computer screen that can be presented to the programmer after selection of the Classic Style 130 from the screen illustrated in FIG. 1. Classic interface 200 includes one or more text input fields 210 for each count of each type of catch event. In this fashion, different audio messages, each tailored to the specific catch event, may be played for each occurrence of the catch event. For example, if the catch event is a user request for help, a text message may be entered in the first text field ("Help 1"), where the message may explain instructions to the user in order to assist them in resolving any confusion the user may have. This text message is recorded and played to the user. Alternately, the text message may be played to the user via Text-To-Speech (TTS) conversion. If the user again requests help, the second text message entered in the next text field ("Help 2") can be played. This message may be different than the first and may, for example, provide additional instructions, instruct the user to dial a phone number where they can be connected to a live operator, or instruct the user to use a DTMF, touch-tone entry in lieu of a voice entry. Similarly, text messages tailored to different catch events (non-match responses and non-input responses) may be created. The illustration in FIG. 2 is only exemplary and illustrates the appearance of a screen where the number of retries has been set to two, i.e. there are two distinct messages played for each count of each catch event. There may be more text fields for each catch event and/or additional catch events.

Each text field in FIG. 2 includes a Clear button 220 to allow the programmer to amend the text entries. Standard Back 225, Finish 230, Cancel 235 and Clear All 240 buttons are included to assist the programmer in creating appropriate text messages. The Add Variable button 250 initiates a listing of variables available to add to a text message, via, for example, a pop-up menu. An Add Pause button 260 has an associated control for setting the pause length (for example, 0.5 seconds) to allow the programmer to insert timed pauses into the audio message. An arrow button 270 allows the programmer to increment or decrement the pause length, typically at 0.1 second increments. Smaller increments can be created by typing directly in the increment field 280. Add Variable button 250 and Add Pause button 260 are activated, preferably, when the cursor insertion point is within a text field 210.

Figure 3:
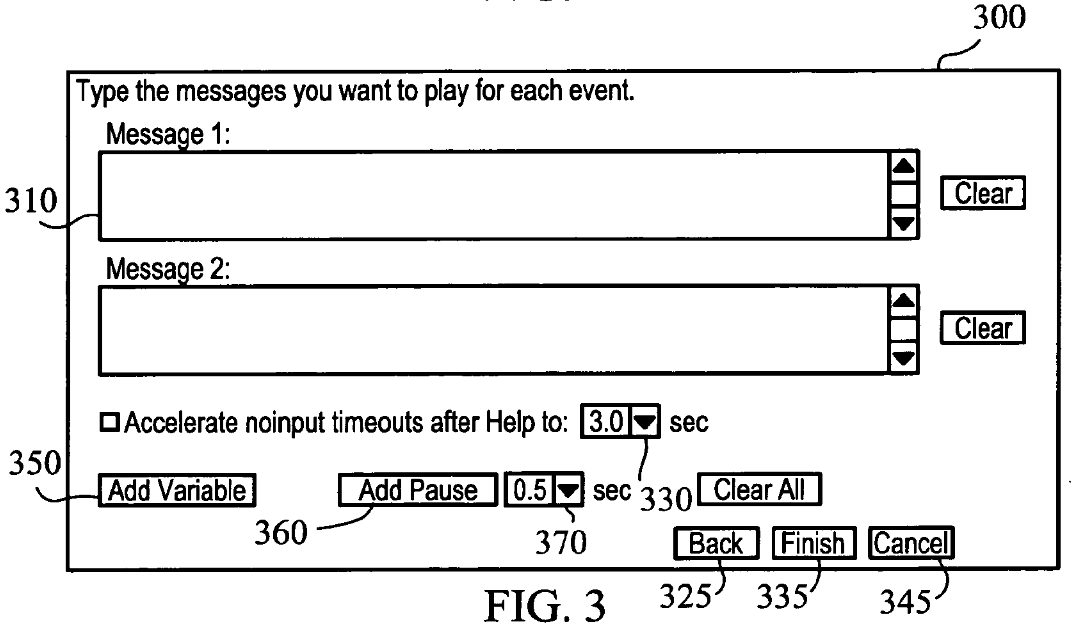
FIG. 3 is a computer screen illustrating an example of the style-selection interface of the present invention where the same contextual message is played for each catch event.

FIG. 3 illustrates an example of a computer screen that is presented to the programmer after selection of the Modern Style 135 from the screen illustrated in FIG. 1. The screen 300 that is presented after selection of the Modern Style 135 from the menu shown in FIG. 1 provides a single text field 310 for each catch event occurrence. In this style, the system will play the same audio message in response to any catch event. This option allows the programmer to choose one message that will adequately respond to any catch event, thereby reducing programming time. The screen shown in FIG. 3 shows the result when the number of retries has been set to two. A second message (Message 2) can be played that is different from the first message (Message 1) after a predefined amount of time. Therefore, although one message is played for all catch events, a second message can be played after a short duration to provide different instructions to the user. This amount of time may be controlled by checking the control box 320 in order to enable a no-input timeout acceleration following a Help event. The invention relating to accelerating no-input timeouts after explicit requests by the user for help is disclosed in pending patent application Ser. No. 10/670,632 filed Sep. 24, 2003, entitled HELP OPTION ENHANCEMENT FOR INTERACTIVE VOICE RESPONSE SYSTEM, the contents of which are incorporated herein by reference. Further, a control box 330 may be used for setting the help acceleration timeout value, typically ranging from 0.5 to 5.0 seconds. Similar to the Classic Style 130 shown in FIG. 2, Add Variable 350, Add Pause 360 and arrow 370 indicators allow the programmer to customize the textual messages. Back 325, Finish 335 and Cancel 345 buttons allow for further navigation between screens.

Figure 4:
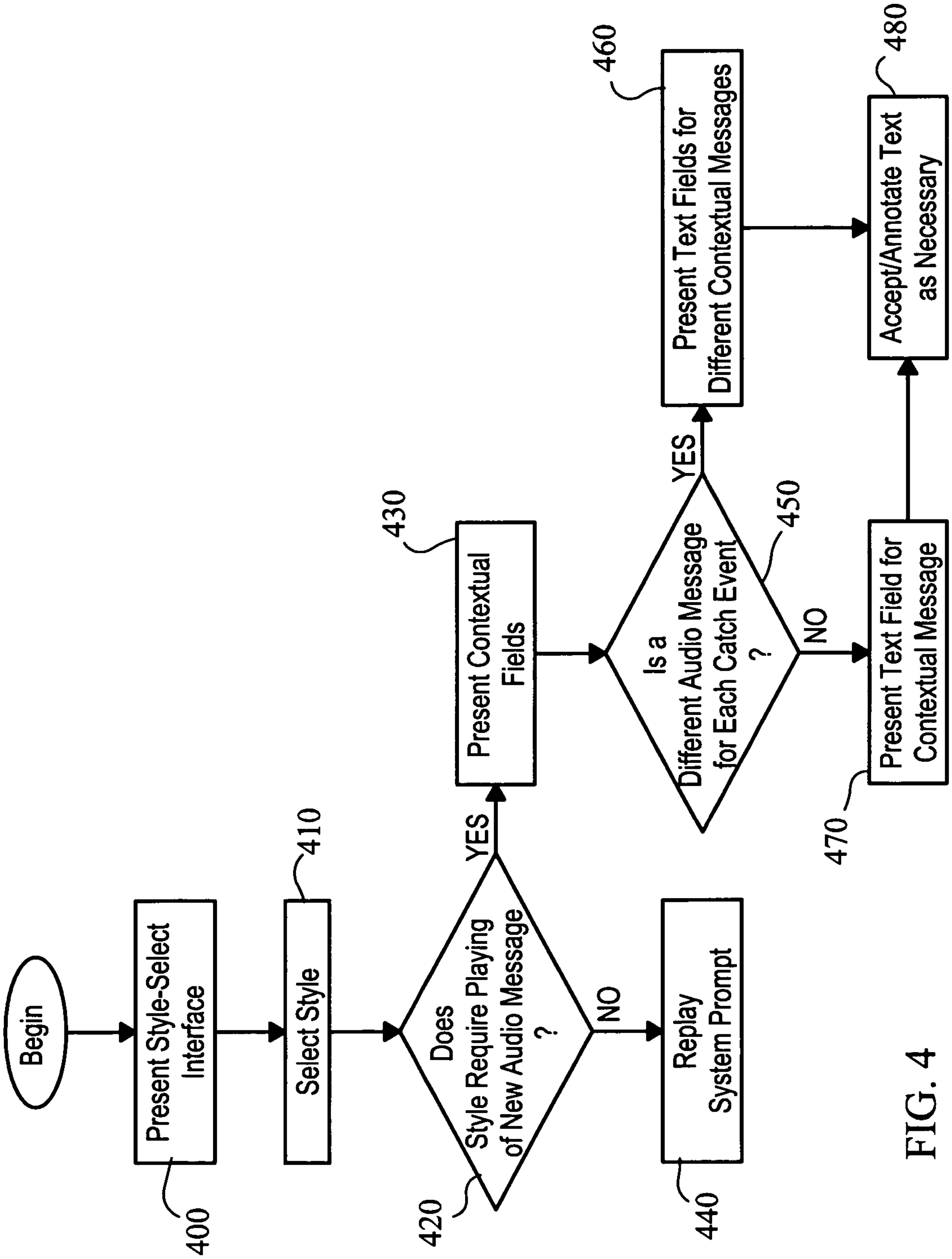
FIG. 4 is a flow chart illustrating an exemplary method for defining standard catch styles in a speech application code.

FIG. 4 is a flowchart illustrating a method for defining standard catch styles resulting in the style selection screens of the type shown in FIGS. 1-3. Beginning in block 400, a programmer is presented with a style selection interface of the type shown in FIG. 1. The programmer then selects a particular catch style via block 410. In decision block 420, if the selected style requires that a new audio message is to be played upon the occurrence of a catch event, then the process continues onto block 430 and contextual fields are presented. If the programmer decides that no audio message is to be played, then the process continues to block 440 and the prompt giving rise to the catch event is replayed.

Once it has been determined that contextual fields are to be presented to the programmer during the style definition process, decision block 450 determines if a different and unique audio message is to be played for each catch event. If different audio messages are required, the process continues to block 460, resulting in a screen similar to the one shown in FIG. 2. If the same audio message is to be played for all catch events, the process continues to block 470, resulting in a screen similar to the one shown in FIG. 3. The text messages may then be accepted or updated as indicated in block 480 via the various tools and buttons described above.

In a graphical use interface for defining call flows that capture the information required for code generation, an embodiment of the present invention provides visual representation of the catch events. For example, a key graphical element such as an icon or an arrow may be provided to allow the programmer to invoke the invention. Therefore by clicking on the icon or using a cursor flyover, the programmer is able to display the contents of the catch-related text messages and other standard style properties. Line coding such as the use of color, width or line break patterns provides information to the programmer reviewing the call flow. For example, a line attribute could indicate the use of the Simple Style, or any other condition where the text messages have not yet been entered in the appropriate text fields in the appropriate format.

Another embodiment of the present invention provides modifications that allow the definition of a global catch template that is applied to all prompts at the time they are generated in the graphical call flow application. For example, in FIG. 1, a control such as a check box may be added that applies the selected style globally to all existing or future prompts created for the speech application. A further modification to the screen shown in FIG. 1 may be the addition of a save box, which, when enabled, saves the text in the text field and applies it to all existing or future prompts. A feature that may also be included is to allow programmers to lock specific prompts in order to prevent future global changes from taking affect. This would be a beneficial tool to the programmer who has customized a specific text prompt and does not want it to be altered by subsequent programmers. A "lock" icon can be added to the key graphical element to allow locking and unlocking via options in the contextual message menu.

These and other enhancements allow the programmer to rapidly and efficiently prototype speech generation code using, for example, the Simple Style 16, then later, regenerate code using another style such as the Classic 18 or the Modern Style 20. For example, if there is any standard text used for any of the text fields, such as a statement used to start the second level of help such as "at any time you can say Help, Repeat, Go Back or Start Over", this can be written only once and automatically copied for each existing or new prompt in the application.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system having a central processing unit and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of defining catch styles used in generating speech application code for managing a plurality of catch events in an interactive voice application, the method comprising steps of:

presenting a style-selection menu for a plurality of catch styles that allows for selection of one or more of the catch styles, each catch style defining a system response to the plurality of catch events in the interactive voice application, wherein the plurality of catch styles provide different levels of complexity with regard to preparing a system's audio response to be played in a dialog turn and the plurality of catch events comprises an event being selected from the group consisting of a user request for help, a non-input entry, and a non-matching entry, wherein the plurality of catch styles includes a Simple catch style for which the system's audio response is to replay a prompt that led to the catch event in the interactive voice application, a Modern catch style for which the system's audio response is to play a same audio message for all catch events in the interactive voice application and a Classic catch style for which the system's audio response is to play different audio messages for at least two types of catch events in the interactive voice application, wherein the at least two types of catch events are selected from the group consisting of a user request for help, a non-input entry, and a non-matching entry;

receiving during programming of the interactive voice application, an indication to associate a catch style with at least one catch event;

determining, with at least one processor, in response to receiving the indication, a currently selected catch style; and associating the currently selected catch style with the at least one catch event by preparing the system response to the at least one catch event in accordance with the currently selected catch style.

2. The method of claim 1, wherein the step of preparing the system response to the at least one catch event comprises:

presenting one or more text fields for receiving a contextual message, the contextual message entered in each text field corresponding to a new audio message to be played in response to a particular catch event if the selected catch style requires playing of the new audio message in response to the particular catch event.

3. The method of claim 2, wherein the entered contextual message is different for each catch event.

4. The method of claim 2, wherein the entered contextual message is the same for each catch event.

5. The method of claim 2, wherein the style-selection menu further includes a control for inserting variables in the contextual message.

6. The method of claim 2, wherein the style-selection menu further includes controls for inserting programmed pauses of specified duration values in the contextual message.

7. The method of claim 1 wherein the preparing the system response for the at least one catch event comprises replaying a system prompt if the currently selected catch style does not require playing of a new audio message in response to a particular catch event.

8. The method of claim 1 wherein the style-selection menu further includes a field reciting details about the one or more catch styles.

9. The method of claim 1 wherein the style-selection menu further includes a field identifying a final action to be taken if a catch event is not corrected by a user.

10. The method of claim 1, wherein the style-selection menu further includes a control to enable acceleration of a system timeout upon occurrence of a help catch event.

11. The method of claim 1, wherein preparing the system's audio response for the at least one catch event is performed in accordance with a global catch template that applies the selected catch style to all existing and future prompts created for the interactive voice application.

12. A system for managing a plurality of catch events in a speech application, the system comprising a computer, the computer being programmed to:

present an interface having a style-selection template for a plurality of catch styles that allows for selection of one or more of the catch styles, each catch style defining a system response to the plurality of catch events in the speech application, wherein the plurality of catch styles provide different levels of complexity with regard to preparing a system's audio response to be played in a dialog turn and the plurality of catch events comprises an event being selected from the group consisting of a user request for help, a non-input entry, and a non-matching entry, wherein the plurality of catch styles includes a Simple catch style for which the system's audio response is to replay a prompt that led to the catch event in the interactive voice application, a Modern catch style for which the system's audio response is to play a same audio message for all catch events in the interactive voice application and a Classic catch style for which the system's audio response is to play different audio messages for at least two types of catch events in the interactive voice application, wherein the at least two types of catch events are selected from the group consisting of a user request for help, a non-input entry, and a non-matching entry;

receive during programming of the interactive voice application, an indication to associate a catch style with at least one catch event;

determine, in response to receiving the indication, a currently selected catch style; and associate the currently selected catch style with the at least one catch event by preparing the system response to the at least one catch event in accordance with the currently selected catch style.

13. The system of claim 12, wherein the interface further comprises one or more text fields for receiving a contextual message, wherein the contextual message entered in each text field corresponds to a new audio message to play in response to a particular catch event.

14. The system of claim 13, wherein the contextual message is different for each catch event.

15. The system of claim 13, wherein the contextual message is the same for each catch event.

16. The system of claim 13, wherein the style-selection interface further includes a control for inserting variables in the contextual message.

17. The system of claim 13, wherein the style-selection interface further includes controls for inserting programmed pauses of specified duration values in the contextual message.

18. The system of claim 12, wherein the interface further includes a field reciting details about the one or more catch styles.

19. The system of claim 12 wherein the interface further includes a field identifying a final action to be taken if a catch event is not corrected by a user.

20. The system of claim 12, wherein the style-selection interface further includes a control to enable acceleration of a system timeout upon occurrence of a help catch event.

21. The system of claim 12, wherein the computer is programmed to prepare the system's audio response for each of the plurality of catch events in the speech application in accordance with a global catch template that applies the selected catch style to all existing and future prompts created for the speech application.

22. A machine readable storage medium storing a computer program which when executed defines catch styles used in generating speech application code for managing a plurality of catch events in a speech application, the computer program performing a method comprising:

presenting a style-selection menu for a plurality of catch styles that allows for selection of one or more of the catch styles, wherein each catch style defines a system response to the plurality of catch events in the speech application, wherein the plurality of catch styles provide different levels of complexity with regard to preparing a system's audio response to be played in a dialog turn and the plurality of catch events comprises an event being selected from the group consisting of a user request for help, a non-input entry, and a non-matching entry, wherein the plurality of catch styles includes a Simple catch style for which the system's audio response is to replay a prompt that led to the catch event in the interactive voice application, a Modern catch style for which the system's audio response is to play a same audio message for all catch events in the interactive voice application and a Classic catch style for which the system's audio response is to play different audio messages for at least two types of catch events in the interactive voice application, wherein the at least two types of catch events are selected from the group consisting of a user request for help, a non-input entry, and a non-matching entry;

receiving during programming of the interactive voice application, an indication to associate a catch style with at least one catch event;

determining, in response to receiving the indication, a currently selected catch style; and associating the currently selected catch style with the at least one catch event by preparing the system response to the at least one catch event in accordance with the currently selected catch style.

23. The machine-readable storage medium of claim 22, wherein preparing the system's audio response for the at least one catch event is performed in accordance with a global catch template that applies the selected catch style to all existing and future prompts created for the speech application.

* * * * *